July 5, 1927.
C. F. HUNTOON
BRAKE BEAM
Filed Oct. 9, 1924
1,634,995
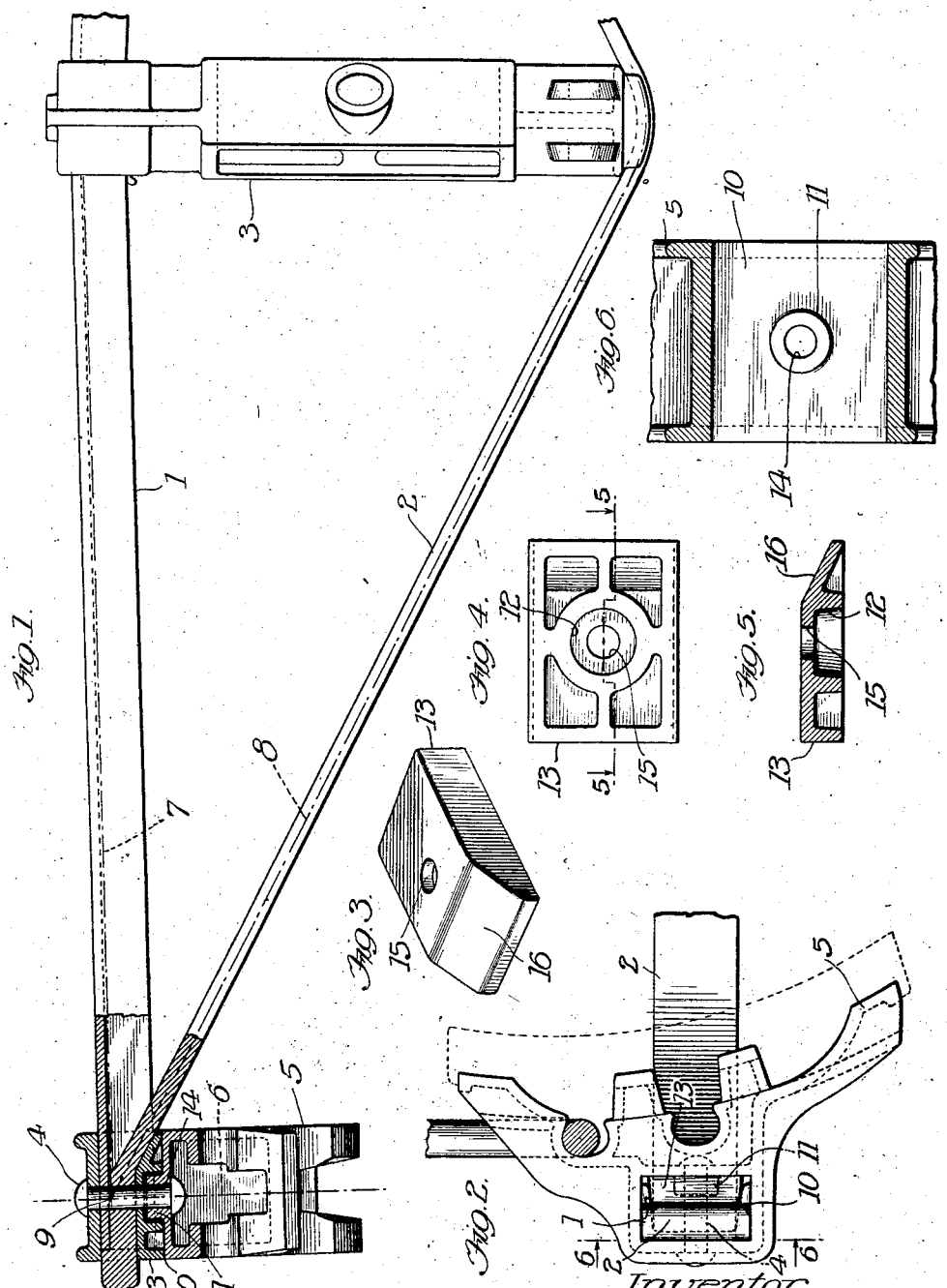

Patented July 5, 1927.

1,634,995

UNITED STATES PATENT OFFICE.

CHARLES F. HUNTOON, OF CHICAGO, ILLINOIS.

BRAKE BEAM.

Application filed October 9, 1924. Serial No. 742,585.

The main objects of this invention are to provide an improved form of brake beam which will eliminate racking or bending of the compression and tension members at points adjacent the brake heads; to provide an improved form of brake head; and to provide improved means for fastening the brake heads to the compression and tension members whereby brake heads of one standard size and form may be used at either end of the beam and may be combined with compression and tension members of various sizes for constructing beams of different capacities.

An illustrative embodiment of this invention is shown in the accompanying drawings, wherein—

Figure 1 is a fragmentary plan of a brake beam showing part in section for the sake of clearness.

Fig. 2 is an end elevation of the same, taken from the left of Fig. 1, part of the brake head hanger and tension strap being broken away, and the braking position of the head being shown in dotted outline.

Fig. 3 is a detail in perspective of one of the filler blocks.

Fig. 4 is a bottom plan of the same.

Fig. 5 is a section of the same taken on the line 5—5 of Fig. 4.

Fig. 6 is an enlarged transverse section of the brake head taken on the line 6—6 of Fig. 2.

The common form of brake beam is of truss-shaped construction, and comprises tension and compression members secured together adjacent their ends and centrally separated by a strut which divides the polygonal structure into two triangular portions for the purpose of rigidity. The brake heads which carry the brake shoes are supported at the ends of the beam, and are usually apertured so as to embrace the compression and tension members. A brake beam of this general type is shown in my copending application, Serial No. 742,584, filed October 9, 1924.

In the usual forms of brake beams heretofore in use, the compression and tension members have been connected together at points inwardly of the extremities thereof so as to provide bearing parts projecting beyond the triangular portions for supporting the brake heads. In such constructions, the load on the brake heads, which is always at substantially right angles to the compression member, has frequently caused a bending of the beam at or near the vicinity of the inner edge of the brake head and thrown the latter out of line. Such bending of the beam is eliminated in a brake beam embodying the present invention, wherein the parts of the beam are so arranged that the neutral axes of the compression and tension members and the central axis or medial vertical plane of the brake head intersect at a common point and the bend in the tension member where its end portions become parallel with the compression member occurs substantially at this same point.

In the specific construction herein shown, the brake beam comprises the usual channel-shaped compression member 1 and tension member or strap 2, separated at their medial parts by a central strut 3, and connected at their ends by rivets 4 and the brake heads 5, which carry the usual brake shoes, not shown. Only one end of the beam is herein shown, but it is to be understood that both ends are identical. The medial vertical planes of the brake heads 5, indicated by dotted line 6, extend through the points of intersection of the neutral axes of the compression and tension members, which are illustrated by dotted lines 7 and 8 respectively, the common point of intersection being indicated at 9 in Fig. 1. In a member of uniform cross section, the neutral axis is located at the center of gravity of the section. The expression "medial vertical plane" is intended to mean a plane parallel with and midway between the two side faces of the brake head.

The brake heads 5 are of one standard size and shape, and are each provided with a transverse opening 10 which is large enough to receive compression and tension members of maximum size. Formed on the brake head 5 and projecting into the opening 10, is a centrally located boss 11, which engages a recess 12 formed in a filler block 13, which is arranged in the opening 10 of the head 5 between the head and the tension member 2. The heads 5 and filler blocks 13 are also centrally apertured, as shown at 14 and 15 respectively, to receive the rivets 4. The inner ends of the filler blocks 13 are bevelled, as shown at 16, to form inclined bearing surfaces for engaging the tension member 2. The brake heads 5 need not be made right and left but may be adapted to the respective ends of the beam by merely reversing the positions of the filler blocks.

The improved brake beam herein shown and described, effects a considerable saving in the materials and patterns over prior brake beams, in that only one size of brake head is required to be kept in stock for building beam of various capacities, the change being made in the filler block alone.

Although but one specific embodiment of this invention has been herein shown and described, it will be understood that numerous details of the construction shown may be altered or omitted without departing from the spirit of this invention as defined by the following claims:

I claim:

1. A brake beam comprising tension and compression members directly connected together at their ends, a brake head at the end of the beam having an opening into which said members extend, a filler block arranged at one side of said members and inserted in said opening between said members and the head, and means for locking said filler block and brake head to said members.

2. A brake beam comprising tension and compression members, a central strut between said members, a pair of brake heads of substantially identical construction located at the ends of the beam and having openings into which said members extend, filler blocks arranged in said openings between said tension members and heads, the inner ends of said blocks being inclined to form bearing surfaces engaging said tension member, each of said filler blocks being reversible in its head whereby said brake heads are interchangeable for use at either end of the beam, and means for securing said filler blocks and brake heads to said members.

3. A brake beam comprising tension and compression members, a brake head at the end of the beam having an opening into which said members extend, a filler block arranged in said opening between said tension member and head, coacting shoulders on the opposed faces of said filler block and head for locking said block against displacement longitudinally of said head, and means for locking said filler block and brake head to said members.

4. A brake beam comprising tension and compression members, a brake head at the end of the beam having an opening into which said members extend, a filler block arranged in said opening between said tension member and head, and a rivet arranged to clamp said filler block and brake head to said members, said rivet being located at the medial vertical plane of said brake head.

Signed at Upland Calif. this 27th day of Sept. 1924.

CHARLES F. HUNTOON.